Patented Sept. 5, 1922.

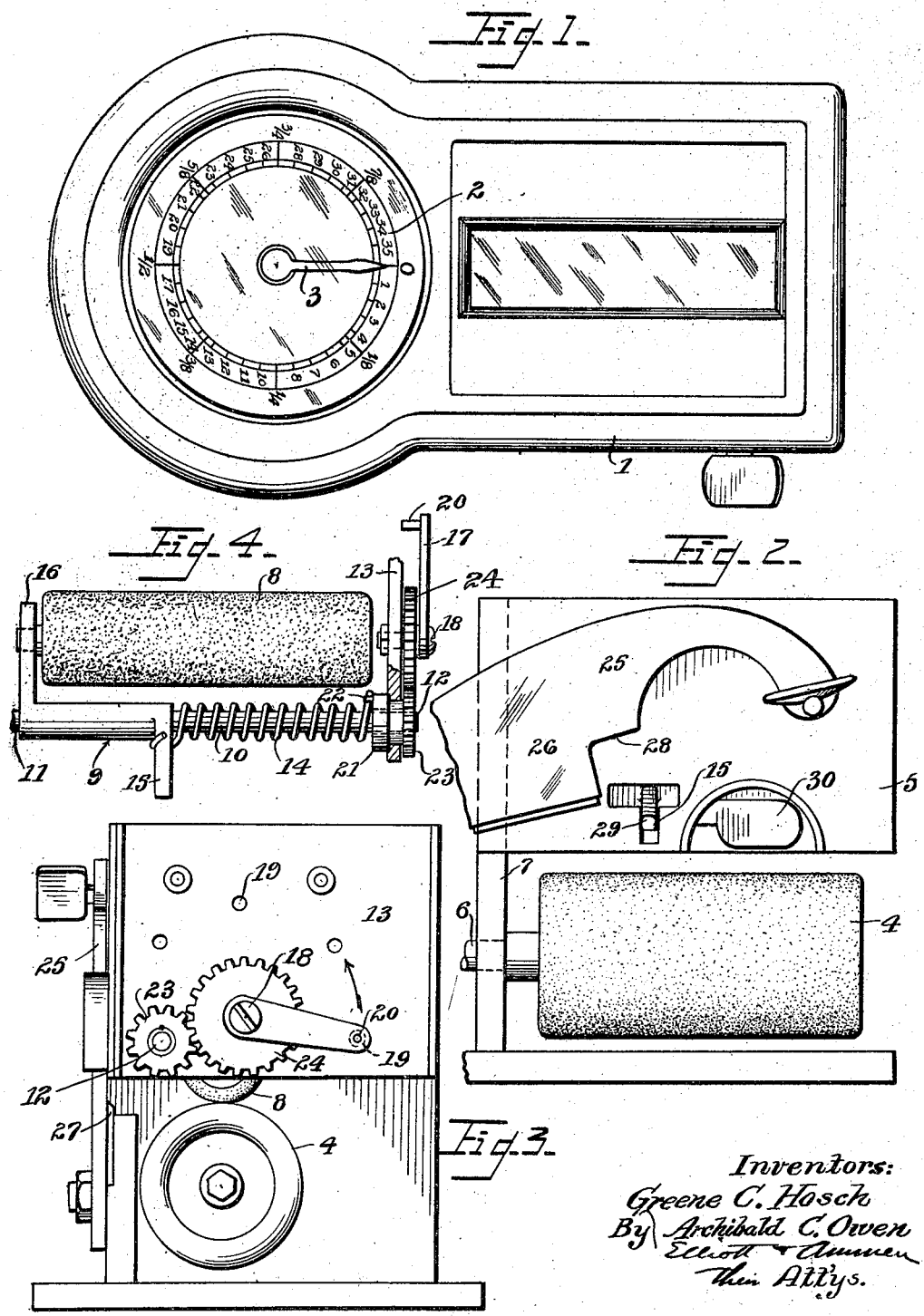

1,428,372

UNITED STATES PATENT OFFICE.

GREENE C. HOSCH, OF ST. LOUIS, MISSOURI, AND ARCHIBALD C. OWEN, OF NEW YORK, N. Y., ASSIGNORS TO THE MEASUREGRAPH COMPANY, OF ST. LOUIS, MISSOURI, A CORPORATION.

SPRING-REGULATING DEVICE FOR PRESSER ROLLERS.

Application filed June 24, 1920. Serial No. 391,353.

*To all whom it may concern:*

Be it known that we, GREENE C. HOSCH and ARCHIBALD C. OWEN, citizens of the United States, residing in the city of St. Louis, State of Missouri, and in the city of New York and State of New York, respectively, have invented new and useful Improvements in Spring-Regulating Devices for Presser Rollers, of which the following is a specification.

This invention relates to fabric measuring or cost computing machines. Such machines usually embody in their construction a measuring roller and a presser roller which co-operates with the measuring roller to press the fabric against the measuring roller. The movement of the fabric through the machine rotates the measuring roller and its motion is imparted to indicating mechanism which indicates the length or cost of the piece of goods measured. The presser roller is usually mounted so that it may be raised from the measuring roller and has a spring associated with it which holds it against the measuring roller or against the fabric lying on the face of the measuring roller. The general object of the present invention is to provide simple means for mounting the spring in association with the presser roller and to provide simple means for regulating at will the force of this spring. Regulating the force of the spring in this way is desirable for several reasons, one of which is that it enables the force of the spring to be adjusted to suit different kinds of material being measured; this is of some importance because it influences somewhat the amount of movement that is imparted to the indicating mechanism, and therefore affects the accuracy of the measurement indicated.

Further objects of the invention will appear hereinafter.

The invention consists in the novel features, and in the general combination of parts to be particularly described hereinafter, all of which contribute to produce a simple and efficient spring regulating device for presser rollers. A preferred embodiment of our invention will be particularly described in the following specification, while the broad scope of our invention will be pointed out in the appended claims.

In the drawing,

Figure 1 is a plan of a machine embodying our invention;

Figure 2 is a side elevation of one end of the machine with the case or casing removed;

Figure 3 is an end elevation of the machine with the casing removed; and

Figure 4 is a detail showing in plan and partial section the presser roller frame and presser roller, together with means for mounting and adjusting the force of the spring.

In the drawing, 1 represents the case or casing of the machine on the upper side of which parts of the indicating mechanism are visible. In the present instance the indicating mechanism merely includes a fixed dial 2 which indicates inches and yard fractions, and with this dial a hand or pointer 3 co-operates. This pointer is driven by a measuring roller 4 (see Figs. 2 and 3), by any suitable mechanism not illustrated. The measuring roller 4 is mounted in the lower portion of the main frame 5 of the machine and is rigid with a driving shaft 6 which extends through a vertical plate 7 which forms a part of the main frame 5 of the instrument.

Co-operating with the measuring roller, we provide a presser roller 8 (see Figs. 3 and 4) and this presser roller is carried by a presser roller frame 9, (see Fig. 4); this presser roller frame is preferably mounted to rock on an axis in the main frame and preferably consists of a bar having a reduced portion or bar 10, rigid therewith and having trunnions 11 and 12, the former of which is mounted to rotate in the frame plate 7 and the latter of which is rotatably supported in a frame plate 13 which forms the end wall of the main frame 5 (see Fig. 3).

Associated with the presser roller frame we provide a spring which may be mounted in any suitable manner. We prefer however, to use a spring such as the coil spring 14 (see Fig. 4) which is mounted upon the reduced extension 10 of the presser roller frame; one end of this spring is secured to the presser roller frame in any suitable manner, and the other end is connected with an adjusting member which is mounted so that it can be moved to adjust the force of the spring; and we provide means for holding the adjusting member in its different positions. For this purpose the inner end of the spring 14 may engage or be secured to an arm 15 which extends from the bar of the presser roller frame 9, and this arm 15 affords means for actuating the frame 9 in raising the presser roller 8 away from the measuring roller. The presser roller 8 may be supported at one end on an oppositely extending arm 16 and the axis of the roller 8 is of course parallel with the axis of the measuring roller 4. The function of this arm 15 in raising the presser roller will be described more in detail hereinafter.

In order to regulate the spring 14 we provide an adjusting member 17 which may be in the form of an arm which is pivotally supported at 18 on the frame. This arm is connected in any suitable manner with the spring 14 so that when the arm is moved into different positions, it will increase or decrease the tension or torsion forces in the spring. In order to hold the arm in different positions, we provide any suitable means, for example, small openings or recesses 19 which are formed in the end plate 13 so as to lie in the path of movement of a pin 20 carried by the arm adjacent to the plate 13. The arm 17 is slightly resilient and in its normal position will hold the pin 20 in one of the openings 19. By pulling the pin out of the opening the arm can be swung to another position so that the pin 20 engages another opening or recess 19. Instead of attaching this arm 17 directly to the spring, we prefer to provide means for increasing the movement transmitted to the adjusted end of the spring. For this purpose we prefer to provide a collar 21 which is loosely mounted on the extension 10 of the frame 9, and this collar engages the adjacent end of the spring by means of a pin 22 (See Fig. 4). The collar is rotatably mounted in the frame plate 13 and constitutes a bearing for the trunnion 12 which forms the end of the extension 10. On the outer side of the plate 13, the collar 21 carries rigidly a pinion 23 and this pinion meshes with a gear wheel 24 which is rigid with the arm 17. Now, when the arm 17 is swung about the point 18, it will be evident that an increased angular movement will be imparted to the collar 21. Evidently the position of the collar 21 will regulate the amount of torsion in the spring 14.

In using the machine, the fabric is pulled in a horizontal direction between the rollers 4 and 8 and after the desired quantity of fabric has been measured, as will be indicated by the pointer 3, the fabric is marked or notched at its edge by means of a pivoted knife lever 25, (See Fig. 2) which carries a knife 26. As this knife descends it co-operates with a fixed knife or blade 27 (See Fig. 3). As the knife descends an edge 28 formed upon it strikes the end of the arm 15 which projects through a slot 29 in the side plate of the frame 5 (See Fig. 2). The downward movement of the lever 25 therefore depresses the arm 15 and this raises the presser roller 8 away from the measuring roller. As the arm 15 descends it is held in a depressed position by a latch 30 which is indicated in Figure 2. The details of this latch are not illustrated as they do not constitute a part of this invention.

It is understood that the embodiment of the invention described herein is only one of the many embodiments our invention may take, and we do not wish to be limited in the practice of our invention nor in our claims, to the particular embodiment set forth.

What we claim is:

1. In a machine of the kind described, having a measuring roller, the combination of a main frame, a presser roller to co-operate with the measuring roller, a presser roller frame carrying the presser roller and movably supported in the main frame to enable the presser roller to move toward or from the measuring roller, a spring to actuate the presser roller frame, an adjusting member connected with the spring and mounted on the main frame, and means for holding the same fixed in different positions to regulate the tension of the spring.

2. In a machine of the kind described, having a measuring roller, the combination of a main frame, a presser roller to co-operate with the measuring roller, a presser roller frame carrying the presser roller and mounted to rock on the main frame to enable the presser roller to move toward or from the measuring roller, a spring to actuate the presser roller frame, an adjusting arm connected with the spring and pivotally mounted on the main frame, and means for holding the adjusting arm in a plurality of different fixed positions to regulate the force of the spring.

3. In a machine of the kind described, having a measuring roller, the combination of a main frame, a presser roller to co-operate with the measuring roller, a presser roller frame carrying the presser roller and consisting of a bar mounted to rock in the main frame to enable the presser roller to move toward or from the measuring roller, a coil spring disposed around the bar and secured to the rocking frame at one end, an adjusting arm rotatably mounted on the main frame, means connecting the same with the other end of the spring to adjust the same, said frame having means for holding the adjusting arm in a plurality of different fixed positions to regulate the force of the spring.

4. In a machine of the kind described, having a measuring roller, the combination of a main frame, a presser roller to co-operate with the measuring roller, a presser roller frame carrying the presser roller and consisting of a bar mounted to rock in the frame to enable the presser roller to move toward or from the measuring roller, a coil spring disposed around the bar, secured to the rocking frame at one end, a rotatable collar on said bar engaging the spring for adjusting the same, an adjusting member mounted on the main frame for rotating the collar to adjust the force of the spring, and means for holding the same in any one of a plurality of different fixed positions.

5. In a machine of the kind described, having a measuring roller, the combination of a main frame, a presser roller to co-operate with the measuring roller, a presser roller frame carrying the presser roller and consisting of a bar mounted to rock in the main frame to enable the presser roller to move toward or from the measuring roller, a coil spring disposed around the bar with one end secured to the roller frame, a rotatable collar on the bar, and engaging the other end of the spring to adjust the same, a pinion rigid with the collar, a gear wheel rotatably mounted on the main frame, meshing with the pinion, and means for holding said gear wheel in a plurality of different fixed positions to regulate the force of the spring.

6. In a machine of the kind described, having a measuring roller, the combination of a main frame, a presser roller to co-operate with the measuring roller, a presser roller frame carrying the presser roller and consisting of a bar mounted to rock in the main frame, and having a laterally projecting arm for actuating the presser roller frame to move the presser roller away from the measuring roller, a coil spring disposed around the bar and engaging the arm, for forcing the presser roller against the measuring roller, a collar rotatably mounted on the bar and engaging the outer end of the spring for adjusting the same, and means for adjusting the collar into a plurality of different fixed positions to regulate the force of the spring.

7. In a machine of the kind described, having a measuring roller, the combination of a main frame, a presser roller to co-operate with the measuring roller, a presser roller frame carrying the presser roller and consisting of a bar mounted to rock in the main frame, a coil spring disposed around the bar secured at one end to the rocking frame, a collar rotatably mounted in the main frame and constituting a bearing for the end of the bar, said collar engaging the other end of the spring, a pinion rigid with the collar, a gear wheel rotatably mounted on the main frame and meshing with the pinion to rotate the same to adjust the spring, an arm rigid with the gear wheel, and means on said frame co-operating with the arm for holding the same in a plurality of different fixed positions.

8. In a machine of the kind described, having a measuring roller, the combination of a main frame, a presser roller to co-operate with the measuring roller, a presser roller frame carrying the presser roller and consisting of a bar mounted to rock in the main frame, a coil spring disposed around the bar, secured at one end to the rocking frame, a collar mounted rotatably in the main frame and constituting a bearing for the end of the bar, said collar engaging the other end of the spring, a pinion rigid with the collar, a gear wheel rotatably mounted on the main frame meshing with the pinion to rotate the same, an arm rigid with the gear wheel and having a pin adjacent to the main frame, said main frame having a plurality of openings to receive the pin to hold the arm in different positions to adjust the force of the spring.

In testimony whereof, we have hereunto set our hands.

GREENE C. HOSCH.
ARCHIBALD C. OWEN.